United States Patent
Hong

(10) Patent No.: US 12,309,645 B2
(45) Date of Patent: May 20, 2025

(54) METHOD, APPARATUS, MOBILE TERMINAL, AND STORAGE MEDIUM FOR CELL RESELECTION

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 276 days.

(21) Appl. No.: 17/625,957

(22) PCT Filed: Jul. 10, 2019

(86) PCT No.: PCT/CN2019/095423
§ 371 (c)(1),
(2) Date: Jan. 10, 2022

(87) PCT Pub. No.: WO2021/003698
PCT Pub. Date: Jan. 14, 2021

(65) Prior Publication Data
US 2022/0248276 A1  Aug. 4, 2022

(51) Int. Cl.
H04W 36/00 (2009.01)
(52) U.S. Cl.
CPC ....... *H04W 36/0027* (2013.01); *H04W 36/00* (2013.01)
(58) Field of Classification Search
CPC ............. H04W 36/00; H04W 36/0055; H04W 36/0027
See application file for complete search history.

(56) References Cited

U.S. PATENT DOCUMENTS

| | | | |
|---|---|---|---|
| 9,271,214 B1* | 2/2016 | Yang | H04W 48/20 |
| 2012/0077494 A1 | 3/2012 | Hong et al. | |
| 2015/0264640 A1* | 9/2015 | Feng | H04W 8/183 |
| | | | 455/558 |
| 2016/0205605 A1 | 7/2016 | Saiprasad | |
| 2017/0150545 A1* | 5/2017 | Ramkumar | H04W 8/082 |
| 2020/0008007 A1* | 1/2020 | Belghoul | H04W 48/18 |

FOREIGN PATENT DOCUMENTS

| | | | | |
|---|---|---|---|---|
| CN | 101217742 A | 7/2008 | | |
| CN | 102421088 A | 4/2012 | | |
| CN | 104796963 A | 7/2015 | | |
| CN | 104918300 A | 9/2015 | | |
| CN | 105744545 A | 7/2016 | | |
| CN | 110383887 A | 10/2019 | | |
| EP | 2437529 A1 * | 4/2012 | ............ | H04W 24/02 |
| WO | 2012109830 A1 | 8/2012 | | |
| WO | 2013010330 A1 | 1/2013 | | |
| WO | 2018176689 A1 | 10/2018 | | |

* cited by examiner

*Primary Examiner* — Jinsong Hu
*Assistant Examiner* — Farideh Madani
(74) *Attorney, Agent, or Firm* — Volpe Koenig

(57) ABSTRACT

A cell reselection method including: carrying out a cell reselection process on a target SIM card among at least two SIM cards so as to obtain a cell reselection result for the target SIM card; and reusing the cell reselection result of the target SIM card for the other SIM card(s) among the at least two SIM cards.

13 Claims, 3 Drawing Sheets

---

Determine, when there is a SIM card in a connected state among at least two SIM cards, the SIM card in the connected state as a target SIM card — 402

Carry out a cell reselection process on the target SIM card among the at least two SIM cards to obtain a cell reselection result of the target SIM card — 404

Reuse the cell reselection result of the target SIM card for other SIM card(s) among the at least two SIM cards — 406

METHOD, APPARATUS, MOBILE TERMINAL, AND STORAGE MEDIUM FOR CELL RESELECTION

CROSS REFERENCE TO RELATED APPLICATION

The present application is a U.S. National Phase of International Patent Application Serial No. PCT/CN2019/095423 filed on Jul. 10, 2019. The entire contents of the above-cited application are hereby incorporated by reference in their entirety for all purposes.

BACKGROUND

A multi-SIM terminal is a mobile terminal where two or more subscriber identity modules (SIMS) can be installed at the same time. For example, a user installs a SIM card 1 for calling and a SIM card 2 for traffic in a multi-SIM terminal.

In the related art, operations of the SIM card 1 and the SIM card 2 are independent with respect to each other. When the multi-SIM terminal moves to the edge of a cell, the SIM card 1 may perform a cell reselection process, and accordingly, the SIM card 2 may also perform a cell reselection process.

The two cell reselection processes may consume extra power of the multi-SIM terminal.

SUMMARY

According to one aspect of the disclosure, a method for cell reselection is provided. The method for cell reselection is applied to a mobile terminal provided with at least two SIM cards, and includes:
  carrying out a cell reselection process on a target SIM card among the at least two SIM cards to obtain a cell reselection result of the target SIM card; and
  reusing the cell reselection result of the target SIM card for other SIM card(s) among the at least two SIM cards.

According to another aspect of the disclosure, a mobile terminal is provided. The mobile terminal is internally provided with at least two SIM cards, and includes:
  a processor; and
  a transceiver connected with the processor.

The processor is configured to load and execute executable instructions to implement the method for cell reselection described as the above aspects and any optional implementation.

According to another aspect of the disclosure, a non-transitory computer-readable storage medium is provided, storing at least one instruction, at least one program, a code set or an instruction set. The at least one instruction, the at least one program, the code set or the instruction set is loaded and executed by a processor to implement the method for cell reselection described as the above aspects and any optional implementation.

It should be understood that the above general description and the following detailed description are only examples and illustrative, and cannot limit the disclosure.

BRIEF DESCRIPTION OF THE DRAWINGS

In order to more clearly illustrate technical solutions in examples of the application, a brief description will be given below to drawings referenced in the description of the examples. Obviously, the drawings referenced in the description below are only some examples of the application, and those ordinarily skilled in the art may further obtain other drawings according to these drawings without involving any inventive effort.

DETAILED DESCRIPTION

Examples will be illustrated in detail herein, and are illustrated in the accompanying drawings. When the following description refers to the accompanying drawings, unless otherwise indicated, the same numbers in different drawings represent the same or similar elements. The implementations described in the following examples do not represent all implementations consistent with the disclosure. On the contrary, they are merely examples of an apparatus and a method consistent with some aspects of the disclosure as detailed in the appended claims.

The communication system and service scenarios described in the examples of the present application are intended to more clearly illustrate the technical solutions of the examples of the present application and do not constitute a limitation of the technical solutions provided by the examples of the present application. Those of ordinary skill in the art would recognize that the technical solutions provided by the examples of the present application are equally applicable to similar technical problems as the communication system evolves and new service scenarios emerge.

Figure 1:
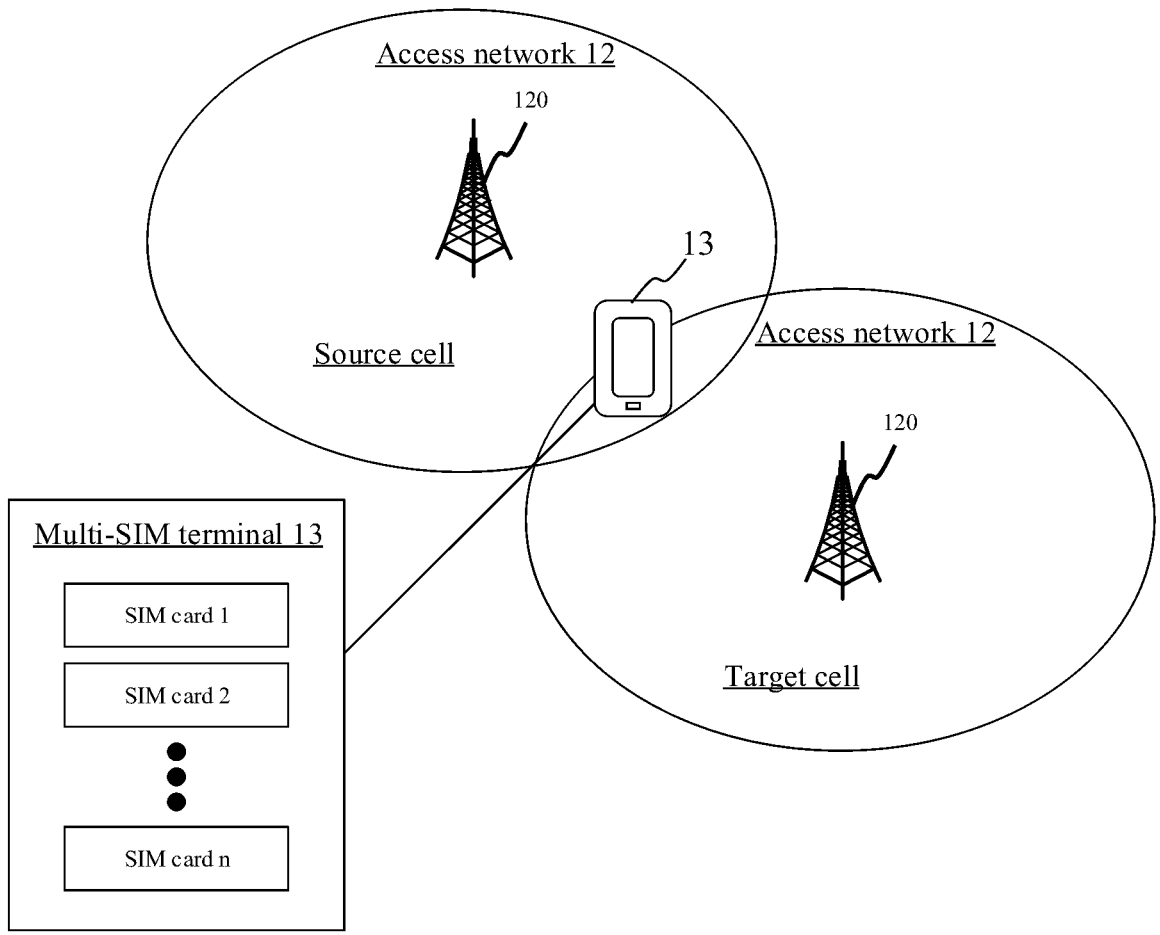
FIG. 1 is a structural block diagram of a communication system according to an example.

FIG. 1 illustrates a block diagram of a communication system provided in an example of the present application, and the communication system may include: an access network 12 and a terminal 13.

The access network 12 includes several access network devices 120. The access network device 120 may be a base station, the base station being an apparatus deployed in the access network to provide a wireless communication function for the terminal. The base station may include various forms of macro base stations, micro base stations, relay stations, access points, etc. In systems using different radio access techniques, the name of a device with a base station function may be different, for example, in an LTE system, the device is called an eNodeB or an eNB; and in a 5G NR system, the device is called a gNodeB or a gNB. As communications technology evolves, the name "base station" may change. For convenience in the examples of the present application, the apparatus providing a wireless communication function for the terminal is collectively referred to as an access network device.

The terminal 13 may include various handheld devices with a wireless communication function, an in-vehicle device, a wearable device, a computing device or other processing devices connected to a wireless modem, and various forms of User Equipment (UE), Mobile Stations (MS), terminal devices, etc. For convenience of description, the devices mentioned above are collectively referred to as a terminal. The access network device 120 and the terminal 13 communicate with each other by means of certain radio technology, such as a Uu interface.

The terminal 13 may be a multi-SIM terminal. The multi-SIM terminal is a mobile terminal with at least two SIM cards installed at the same time. The SIM card may be a SIM card in a hardware form or a SIM card in a software form, which is not limited in the disclosure. Each SIM may have its own International Mobile Equipment Identity (IMEI).

Taking the terminal 13 as an example of a multi-SIM mobile phone, typical application scenarios include the following two:

I. A business user has a private SIM card and a SIM card for business, and places both SIM cards in a same mobile phone.

II. An ordinary user has multiple private SIM cards and may choose which SIM card to use according to a service.

These SIM cards may be from a same operator or from different operators.

Currently, a processing method for a multi-SIM mobile phone is mainly based on the implementation of each terminal manufacturer, and there is no unified standard for regulation, thus leading to many different terminal behaviors and processing methods (such as dual card single standby, dual card dual standby single pass, and dual card dual standby dual pass, etc.). In addition, a dual-SIM dual-standby terminal generally applies for two IMEIs, and each international mobile subscriber identification number (IMSI) corresponds to one IMEI. This is because when a multi-SIM terminal resides on a network, the network may perform identity verification, and if dual cards of a dual-card terminal use the same IMEI, a core network may experience confusion, which may cause the identity verification to fail and eventually lead to residence failure of the terminal. But now for a multi-SIM terminal, a current network is to treat different SIM cards as different terminals, and multiple SIM cards of the multi-SIM terminal are also subjected to separate cell reselection. When the terminal performs cell reselection, signal strengths of a plurality of neighboring cells need to be measured, and selection is made according to rules set by base stations. The measurement process may consume power of the terminal.

Figure 2:
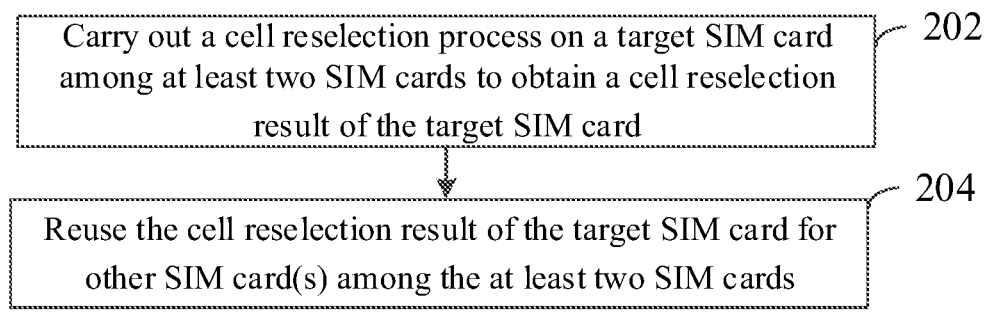
FIG. 2 is a flowchart of a method for cell reselection according to an example.

FIG. 2 is a flowchart of a method for cell reselection provided by an example of the disclosure. The method may be applied to a terminal 13 as shown in FIG. 1. The terminal 13 may be a double-SIM card terminal or a multi-SIM terminal. At least two SIM cards are disposed in the terminal 13. The method includes:

Step 202, a cell reselection process is carried out on a target SIM card among the at least two SIM cards to obtain a cell reselection result of the target SIM card.

When the terminal moves to an edge of a cell, the cell reselection process is carried out on the target SIM card among the at least two SIM cards.

The terminal performs cell measurement of a neighboring cell on the target SIM card, and determines, when the signal quality of the neighboring cell is better than the signal quality of a current resident cell (source cell) to meet a predetermined condition, the neighboring cell as a target cell for residence.

Step 204, the cell reselection result of the target SIM card is reused for other SIM card(s) among the at least two SIM cards.

After the target SIM card completes the cell reselection process, the other SIM card(s) may reuse the cell reselection result of the target SIM card.

For example, the terminal determines a reselected target cell in the cell reselection result of the target SIM card as a resident cell (or serving cell) of the other SIM card(s) among the at least two SIM cards.

In summary, in the method provided by the example, the cell reselection result of the target SIM card is obtained by carrying out the cell reselection process on the target SIM card among the at least two SIM cards, and the cell reselection result of the target SIM card is reused for the other SIM card(s) among the at least two SIM cards, so the cell reselection process does not need to be carried out on the other SIM card(s), result in reducing monitoring and measurement of cell signals, saving power of a multi-SIM terminal, and improving a battery life of the multi-SIM terminal.

Figure 3:
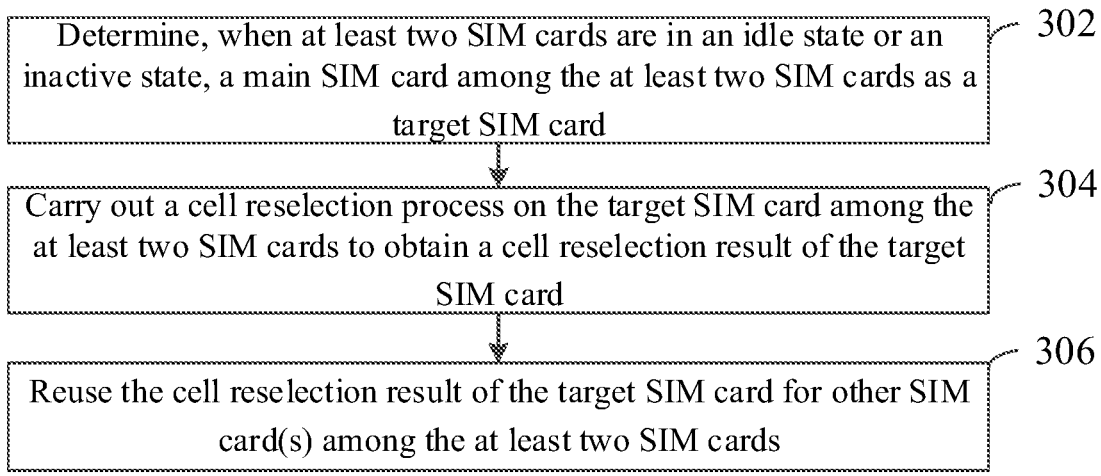
FIG. 3 is a flowchart of a method for cell reselection according to another example.

FIG. 3 is a flowchart of a method for cell reselection provided by another example of the disclosure. The method may be applied to a terminal 13 as shown in FIG. 1. The terminal 13 may be a double-SIM card terminal or a multi-SIM terminal. At least two SIM cards are disposed in the terminal 13. The method includes:

Step 302, when the at least two SIM cards are in an idle state or an inactive state, a main SIM card among the at least two SIM cards is determined as a target SIM card.

A plurality of SIM cards are disposed in the terminal 13, one of which is designated as the main SIM card. For example, the terminal defaults to a SIM card as the main SIM card (for example, a SIM card in a SIM card slot 1 is the main SIM card); or, a core network designates a SIM card as the main SIM card; or an access network designates a SIM card as the main SIM card; or, a user designates a SIM card as the main SIM card (for example, the user designates a SIM card in a setting interface of an operating system as the main SIM card).

Correspondingly, when the at least two SIM cards are in an idle state or in an inactive state, the default main SIM card among the at least two SIM cards is determined as the target SIM card. Or, when the at least two SIM cards are in the idle state or in the inactive state, the main SIM card designated by the core network among the at least two SIM cards is determined as the target SIM card. Or, when the at least two SIM cards are in the idle state or in the inactive state, the main SIM card designated by the access network among the at least two SIM cards is determined as the target SIM card. Or, when the at least two SIM cards are in the idle state or in the inactive state, the main SIM card designated by the user among the at least two SIM cards is determined as the target SIM card.

Step 304, a cell reselection process is carried out on the target SIM card among the at least two SIM cards to obtain a cell reselection result of the target SIM card.

When the terminal moves to an edge of a cell, the cell reselection process is carried out on the target SIM card among the at least two SIM cards.

The terminal performs cell measurement of a neighboring cell on the target SIM card, and determines, when a predetermined condition is met, the neighboring cell as a target cell for residence.

Step 306, the cell reselection result of the target SIM card is reused for other SIM card(s) among the at least two SIM cards.

For example, the terminal determines a reselected target cell in a cell reselection result of the main SIM card as a resident cell (or serving cell) of the other SIM card(s), except for the main SIM card, among the at least two SIM cards.

In summary, in the method provided by the example, the cell reselection result of the target SIM card is obtained by carrying out the cell reselection process on the target SIM card among the at least two SIM cards, and the cell reselection result of the target SIM card is reused for the other SIM card(s) among the at least two SIM cards, so the cell reselection process does not need to be carried out on the other SIM card(s), resulting in reducing monitoring and measurement of cell signals, saving power of a multi-SIM terminal, and improving a battery life of the multi-SIM terminal.

Figure 4:
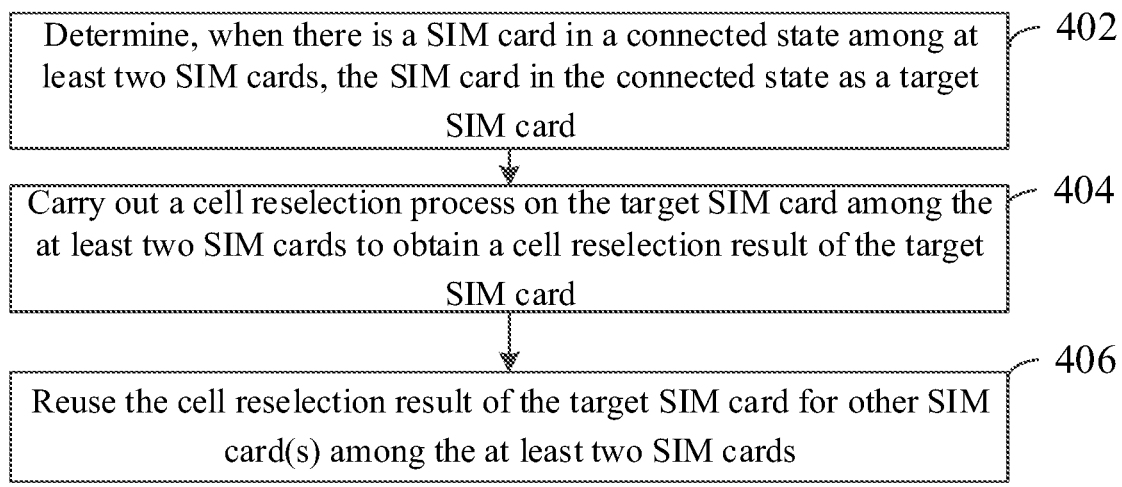
FIG. 4 is a flowchart of a method for cell reselection according to yet another example.

FIG. 4 is a flowchart of a method for cell reselection provided by yet another example of the disclosure. The method may be applied to a terminal 13 as shown in FIG. 1. The terminal 13 may be a double-SIM card terminal or a multi-SIM terminal. At least two SIM cards are disposed in the terminal 13. The method includes:

Step 402, when there is a SIM card in a connected state among the at least two SIM cards, the SIM card in the connected state is determined as a target SIM card.

A plurality of SIM cards are disposed in the terminal 13, and when there is a SIM card in an RRC connected state, the SIM card in the RRC connected state is determined as the target SIM card.

For example, when there is more than one SIM card (including a main SIM card) in the RRC connected state, the main SIM card in the RRC connected state is determined as the target SIM card.

For example, when there is more than one SIM card (excluding the main SIM card) in the RRC connected state, one SIM card in the RRC connected state is determined as the target SIM card in an order of priority. The order of priority may be specified by the terminal, or predefined by a communication protocol, or configured by a network side.

Step 404, a cell reselection process is carried out on the target SIM card among the at least two SIM cards to obtain a cell reselection result of the target SIM card.

When the terminal moves to an edge of a cell, the cell reselection process is carried out on the target SIM card among the at least two SIM cards.

The terminal performs cell measurement of a neighboring cell on the target SIM card, and determines, when a predetermined condition is met, the neighboring cell as a target cell for residence.

Step 406, the cell reselection result of the target SIM card is reused for other SIM card(s) among the at least two SIM cards.

For example, the terminal determines a reselected target cell in a cell reselection result of the main SIM card as a resident cell (or serving cell) of the other SIM card(s), except for the target SIM card, among the at least two SIM cards.

For example, when the SIM card in the connected state is not the main SIM card and the main SIM card is in an idle state or an inactive state, a reselected target cell in a cell reselection result of the SIM card in the connected state is determined as a resident cell of the main SIM card.

In summary, in the method provided by the example, the cell reselection result of the target SIM card is obtained by carrying out the cell reselection process on the target SIM card among the at least two SIM cards, and the cell reselection result of the target SIM card is reused for the other SIM card(s) among the at least two SIM cards, so the cell reselection process does not need to be carried out on the other SIM card(s), resulting in reducing monitoring and measurement of cell signals, saving power of a multi-SIM terminal, and improving a battery life of the multi-SIM terminal.

Figure 5:
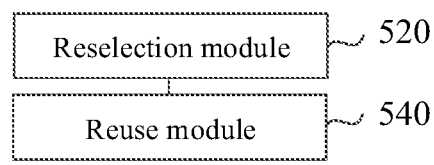
FIG. 5 is a block diagram of an apparatus for cell reselection according to another example.

FIG. 5 is a block diagram of an apparatus for cell reselection provided by an example of the disclosure. At least two SIM cards are disposed in the apparatus. The apparatus may be implemented as part or all of a mobile terminal through software, hardware or a combination of the two. The apparatus includes:

a reselection module 520, configured to carry out a cell reselection process on a target SIM card among the at least two SIM cards to obtain a cell reselection result of the target SIM card; and a reuse module 540, configured to reuse the cell reselection result of the target SIM card for other SIM card(s) among the at least two SIM cards.

In an optional example, the reselection module 520 is configured to determine a reselected target cell in the cell reselection result of the target SIM card as a resident cell of the other SIM card(s) among the at least two SIM cards.

In an optional example, the at least two SIM cards belong to the same operator network.

In an optional example, the apparatus further includes:

a determining module 560, configured to determine, when the at least two SIM cards are in an idle state or an inactive state, a default main SIM card among the at least two SIM cards as the target SIM card;

or, the determining module 560, configured to determine, when the at least two SIM cards are in the idle state or in the inactive state, a main SIM card designated by a core network among the at least two SIM cards as the target SIM card;

or, the determining module 560, configured to determine, when the at least two SIM cards are in the idle state or in the inactive state, a main SIM card designated by an access network among the at least two SIM cards as the target SIM card;

or, the determining module 560, configured to determine, when the at least two SIM cards are in the idle state or in the inactive state, a main SIM card designated by a user among the at least two SIM cards as the target SIM card.

In an optional example, the determining module 560 is configured to determine, when there is a SIM card in a connected state among the at least two SIM cards, the SIM card in the connected state as the target SIM card.

In an optional example, the reuse module 540 is configured to determine, when the SIM card in the connected state is not a main SIM card and the main SIM card is in an idle state or an inactive state, a reselected target cell in a cell reselection result of the SIM card in the connected state as a resident cell of the main SIM card.

Figure 6:
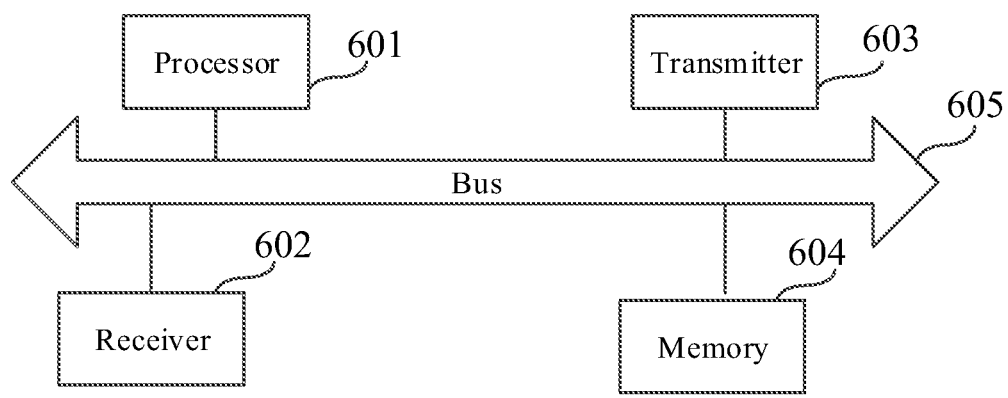
FIG. 6 is a schematic structural diagram of a terminal according to an example.

FIG. 6 is a schematic structural diagram of a terminal provided by an example of the disclosure. The terminal includes: a processor 601, a receiver 602, a transmitter 603, a memory 604, and a bus 605.

The processor 601 includes one or more processing cores, and the processor 601 executes various functional applications and information processing by running software programs and modules.

The receiver 602 and the transmitter 603 may be implemented as one communication component, and the communication component may be a communication chip.

The memory 604 is connected with the processor 601 through the bus 605.

The memory 604 may be configured to store at least one instruction, and the processor 601 is configured to execute the at least one instruction to implement each step in the above method examples.

In addition, the memory 604 may be implemented by any type of volatile or non-volatile storage device or a combination of them. The volatile or non-volatile storage device includes, but is not limited to: a magnetic disk or compact disc, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

In an example, a non-transitory computer-readable storage medium including instructions is further provided, such as a memory including instructions. The above instructions may be executed by a processor of a terminal to complete the above method for cell reselection. For example, the non-transitory computer-readable storage medium may be an ROM, a random access memory (RAM), a CD-ROM, a magnetic tape, a floppy disk, an optical data storage device, etc.

Provided is a non-transitory computer-readable storage medium, when instructions in the non-transitory computer-readable storage medium are executed by a processor of a terminal, the terminal may execute the above method for cell reselection.

An example of the disclosure further provides a computer-readable storage medium, storing at least one instruction, at least one program, a code set or an instruction set. The at least one instruction, the at least one program, the code set or the instruction set is loaded and executed by a processor to implement the method for cell reselection provided by the above method examples.

The technical solutions provided by the examples of the disclosure may include the following beneficial effects:

the cell reselection result of the target SIM card is obtained by carrying out the cell reselection process on the target SIM card among the at least two SIM cards, and the cell reselection result of the target SIM card is reused for the other SIM card(s) among the at least two SIM cards, so the cell reselection process does not need to be carried out on the other SIM card(s), resulting in reducing monitoring and measurement of cell signals, saving power of a multi-card terminal, and improving a battery life of the multi-card terminal.

It should be understood that "plurality" mentioned herein refers to two or more. "And/or" describes an association relationship of associated objects, and indicates that there may be three types of relationships. For example, A and/or B may mean: A exists alone, A and B exist at the same time, and B exists alone. The character "/" generally indicates that the former and latter associated objects are in an "or" relationship.

Other examples of the disclosure will be apparent to those skilled in the art from consideration of the specification and practice of the disclosure disclosed herein. The disclosure is intended to cover any variations, uses, or adaptations of the disclosure following, the general principles of the disclosure and including common general knowledge or customary technical means in the art that are not disclosed in the disclosure. It is intended that the specification and examples be considered as illustrative only.

It will be appreciated that the disclosure is not limited to the exact construction that has been described above and illustrated in the accompanying drawings, and that various modifications and changes may be made without departing from the scope of the disclosure.

The invention claimed is:

1. A method for cell reselection, applied to a mobile terminal provided with at least two subscriber identity module (SIM) cards, and comprising:
   determining, when there is a SIM card in a connected state among the at least two SIM cards, the SIM card in the connected state as a target SIM card;
   carrying out a cell reselection process on the target SIM card among the at least two SIM cards to obtain a cell reselection result of the target SIM card; and
   reusing the cell reselection result of the target SIM card for another SIM card(s) among the at least two SIM cards;
   wherein reusing the cell reselection result of the target SIM card for the another SIM card(s) among the at least two SIM cards comprises:
   determining, when the SIM card in the connected state is not a main SIM card and the main SIM card is in an idle state or an inactive state, a reselected target cell in a cell reselection result of the SIM card in the connected state as a resident cell of the main SIM card.

2. The method according to claim 1, wherein reusing the cell reselection result of the target SIM card for the another SIM card(s) among the at least two SIM cards further comprises:
   determining the reselected target cell in the cell reselection result of the target SIM card as a resident cell of SIM card(s) other than the main SIM card among the at least two SIM cards.

3. The method according to claim 1, wherein the at least two SIM cards belong to a same operator network.

4. The method according to claim 1, further comprising:
   determining, when the at least two SIM cards are in the idle state or the inactive state, the main SIM card among the at least two SIM cards as the target SIM card, wherein
   the main SIM card is defaulted; or
   the main SIM card is designated by a core network; or
   the main SIM card is designated by an access network; or
   the main SIM card is designated by a user.

5. The method according to claim 1, wherein:
   the cell reselection result carried out by the target SIM card includes identification of a reselected target cell; and
   determining the reselected target cell in the cell reselection result of the SIM card in the connected state as the resident cell of the main SIM card comprises:
   determining the reselected target cell in the cell reselection result of the SIM card in the connected state as the resident cell of the main SIM card without conducting a cell reselection process.

6. A mobile terminal, internally provided with at least two subscriber identity module (SIM) cards, and comprising:
   a processor; and
   a transceiver connected with the processor, wherein
   the processor is configured to load and execute executable instructions to:
   determine, when there is a SIM card in a connected state among the at least two SIM cards, the SIM card in the connected state as a target SIM card;
   carry out a cell reselection process on the target SIM card among the at least two SIM cards to obtain a cell reselection result of the target SIM card; and
   reuse the cell reselection result of the target SIM card for another SIM card(s) among the at least two SIM cards;

wherein the processor is further configured to load and execute executable instructions to:

determine, when the SIM card in the connected state is not a main SIM card and the main SIM card is in an idle state or an inactive state, a reselected target cell in a cell reselection result of the SIM card in the connected state as a resident cell of the main SIM card.

7. The mobile terminal according to claim 6, wherein the processor is further configured to load and execute executable instructions to:

determine the reselected target cell in the cell reselection result of the target SIM card as a resident cell of SIM card(s) other than the main SIM card among the at least two SIM cards.

8. The mobile terminal according to claim 6, wherein the at least two SIM cards belong to a same operator network.

9. The mobile terminal according to claim 6, wherein the processor is further configured to load and execute executable instructions to determine, when the at least two SIM cards are in the idle state or the inactive state, the main SIM card among the at least two SIM cards as the target SIM card, wherein:

the main SIM card is defaulted; or
the main SIM card is designated by a core network; or
the main SIM card is designated by an access network; or
the main SIM card is designated by a user.

10. A non-transitory computer-readable storage medium, storing at least one instruction, at least one program, a code set, or an instruction set, wherein the at least one instruction, the at least one program, the code set or the instruction set is loaded and executed by a processor to:

determine, when there is a SIM card in a connected state among the at least two SIM cards, the SIM card in the connected state as a target SIM card;

carry out a cell reselection process on the target SIM card among the at least two SIM cards to obtain a cell reselection result of the target SIM card; and reuse the cell reselection result of the target SIM card for another SIM card(s) among the at least two SIM cards;

wherein the at least one instruction, the at least one program, the code set or the instruction set is loaded and executed by the processor to:

determine, when the SIM card in the connected state is not a main SIM card and the main SIM card is in an idle state or an inactive state, a reselected target cell in a cell reselection result of the SIM card in the connected state as a resident cell of the main SIM card.

11. The non-transitory computer-readable storage medium according to claim 10, wherein the at least one instruction, the at least one program, the code set or the instruction set is loaded and executed by the processor to:

determine the reselected target cell in the cell reselection result of the target SIM card as a resident cell of SIM card(s) other than the main SIM card among the at least two SIM cards.

12. The non-transitory computer-readable storage medium according to claim 10, wherein a at least two SIM cards belong to the same operator network.

13. The non-transitory computer-readable storage medium according to claim 10, wherein the at least one instruction, the at least one program, the code set or the instruction set is loaded and executed by the processor to determine, when the at least two SIM cards are in the idle state or the inactive state, the main SIM card among the at least two SIM cards as the target SIM card, wherein:

the main SIM card is defaulted; or
the main SIM card is designated by a core network; or
the main SIM card is designated by an access network; or
the main SIM card is designated by a user.

* * * * *

UNITED STATES PATENT AND TRADEMARK OFFICE
CERTIFICATE OF CORRECTION

PATENT NO. : 12,309,645 B2
APPLICATION NO. : 17/625957
DATED : May 20, 2025
INVENTOR(S) : Wei Hong Page 1 of 1

It is certified that error appears in the above-identified patent and that said Letters Patent is hereby corrected as shown below:

In the Specification

In Column 1, Line 17, delete "(SIMS)" and insert -- (SIMs) --, therefor.
In Column 1, Line 47, delete "described as" and insert -- described in --, therefor.
In Column 1, Line 55, delete "described as" and insert -- described in --, therefor.
In Column 3, Lines 29-30, delete "international mobile subscriber identification number (IMSI)" and insert -- international mobile subscriber identity (IMSI) number --, therefor.

Signed and Sealed this
Fifteenth Day of July, 2025

Coke Morgan Stewart
*Acting Director of the United States Patent and Trademark Office*